(12) United States Patent
Aswani et al.

(10) Patent No.: US 8,719,817 B2
(45) Date of Patent: May 6, 2014

(54) VIRTUALIZATION INTERMEDIARY/VIRTUAL MACHINE GUEST OPERATING SYSTEM COLLABORATIVE SCSI PATH MANAGEMENT

(75) Inventors: Sanjana Aswani, Boston, MA (US); Hariharan Subramanian, Wakefield, MA (US); Edward Joseph Goggin, Concord, MA (US); Vibhor Arunkumar Patale, Bangalore (IN); Rupesh Bajaj, Madhya Pradesh (IN)

(73) Assignee: VMware, Inc., Palo Alto, CA (US)

( * ) Notice: Subject to any disclaimer, the term of this patent is extended or adjusted under 35 U.S.C. 154(b) by 488 days.

(21) Appl. No.: 12/731,265

(22) Filed: Mar. 25, 2010

(65) Prior Publication Data

US 2011/0239213 A1    Sep. 29, 2011

(51) Int. Cl.
*G06F 9/455* (2006.01)
(52) U.S. Cl.
USPC ............................................................ 718/1
(58) Field of Classification Search
None
See application file for complete search history.

(56) References Cited

U.S. PATENT DOCUMENTS

| 7,209,994 | B1 | 4/2007 | Klaiber et al. | |
|---|---|---|---|---|
| 7,568,056 | B2 | 7/2009 | Danilak | |
| 2008/0294808 | A1* | 11/2008 | Mahalingam et al. | 710/26 |
| 2009/0133028 | A1 | 5/2009 | Brown et al. | |
| 2009/0222558 | A1 | 9/2009 | Xu | |
| 2009/0248915 | A1 | 10/2009 | Sato | |
| 2010/0100878 | A1* | 4/2010 | Otani | 718/1 |
| 2010/0122111 | A1* | 5/2010 | Allen et al. | 714/3 |
| 2010/0162238 | A1* | 6/2010 | Warfield | 718/1 |
| 2010/0232443 | A1* | 9/2010 | Pandey | 370/401 |
| 2011/0119665 | A1* | 5/2011 | Santos et al. | 718/1 |

OTHER PUBLICATIONS

PCI-SIG SR-IOV Primer, An Introduction to SR-IOV Technology, Intel LAN Access Division, Revision 2.0, Dec. 2008.
Single Root I/O Virtualization and Sharing Specification Revision 1.0, Sep. 11, 2003 [See, http://www.pcisig.com/specifications/iov/review_zone/archive].
QLogic's Open Standards Based Host and Fabric Virtualization Solution 8Gb FC Adapters Offer NPIV Based Quality of Service (QoS), White Paper by QLogic Corporation, dated 2009.

\* cited by examiner

*Primary Examiner* — Emerson Puente
*Assistant Examiner* — Dong Kim

(57) ABSTRACT

A method of direct access by a virtual machine (VM) running on a host machine to physical storage via a virtual function (VF) running on an input/output (IO) adapter comprising: providing by a virtualization intermediary running on the host machine an indication of an active path associated with a virtual storage device; obtaining by a guest driver running within a guest operating system of the VM the stored indication of the active path from the shared memory region; dispatching an IO request by the guest driver to the VF that includes an indication of the active path; and sending by the VF an IO request that includes the indicated active path.

20 Claims, 10 Drawing Sheets

Driver cache - VM1

| Virtual Initiator | Virtual Target | Virtual Lun | Physical Initiator | Physical Target | Physical Lun |
|---|---|---|---|---|---|
| $VI_1$ | $VT_1$ | $VL_1$ | | | |
| $VI_2$ | $VT_2$ | $VL_2$ | | | |
| . | . | . | | | |
| . | . | . | | | |
| $VI_n$ | $VT_n$ | $VL_n$ | $PI_n$ | $PT_n$ | $PL_n$ |
| $VI_{n+1}$ | $VT_{n+1}$ | $VL_{n+1}$ | | | |

Driver cache - VM1

| Virtual Initiator | Virtual Target | Virtual Lun | Physical Initiator | Physical Target | Physical Lun |
|---|---|---|---|---|---|
| $VI_1$ | $VT_1$ | $VL_1$ | $PI_1$ | $PT_1$ | $PL_1$ |
| $VI_2$ | $VT_2$ | $VL_2$ | $PI_2$ | $PT_2$ | $PL_2$ |
| . | . | . | | | |
| . | . | . | | | |
| $VI_n$ | $VT_n$ | $VL_n$ | | | |
| $VI_{n+1}$ | $VT_{n+1}$ | $VL_{n+1}$ | $PI_{n+1}$ | $PT_{n+1}$ | $PL_{n+1}$ |

Shared Area - VM1 — 902

| VM | Virtual Initiator | Virtual Target | Virtual Lun | Physical Initiator | Physical Target | Physical Lun |
|---|---|---|---|---|---|---|
| VM1 | $VI_1$ | $VT_1$ | $VL_1$ | $PI_1$ | $PT_1$ | $PL_1$ |
| . | $VI_2$ | $VT_2$ | $VL_2$ | $PI_2$ | $PT_2$ | $PL_2$ |
| . | . | . | . | | | |
| . | . | . | . | | | |
| VM1 | $VI_n$ | $VT_n$ | $VL_n$ | $PI_n$ | $PT_n$ | $PL_n$ |
| VM1 | $VI_{n+1}$ | $VT_{n+1}$ | $VL_{n+1}$ | $PI_{n+1}$ | $PT_{n+1}$ | $PL_{n+1}$ |

FIG. 9

Driver cache - VM1

| Virtual Initiator | Virtual Target | Virtual Lun | Physical Initiator | Physical Target | Physical Lun |
|---|---|---|---|---|---|
| $VI_1$ | $VT_1$ | $VL_1$ | $PI_1$ | $PT_1$ | $PL_1$ |
| $VI_2$ | $VT_2$ | $VL_2$ | $PI_2$ | $PT_2$ | $PL_2$ |
| . | . | . | | | |
| . | . | . | | | |
| $VI_n$ | $VT_n$ | $VL_n$ | | | |
| $VI_{n+1}$ | $VT_{n+1}$ | $VL_{n+1}$ | $PI_{n+1}$ | $PT_{n+1}$ | $PL_{n+1}$ |

Shared Area - VM1 — 1102

| VM | Virtual Initiator | Virtual Target | Virtual Lun | Physical Initiator | Physical Target | Physical Lun |
|---|---|---|---|---|---|---|
| VM1 | $VI_1$ | $VT_1$ | $VL_1$ | $PI_1$ | $PT_1$ | $PL_1$ |
| . | $VI_2$ | $VT_2$ | $VL_2$ | $PI_2$ | $PT_2$ | $PL_2$ |
| . | . | . | . | | | |
| . | . | . | . | | | |
| VM1 | $VI_n$ | $VT_n$ | $VL_n$ | | | |
| VM1 | $VI_{n+1}$ | $VT_{n+1}$ | $VL_{n+1}$ | $PI_{n+1}$ | $PT_{n+1}$ | $PL_{n+1}$ |

FIG. 11

VIRTUALIZATION INTERMEDIARY/VIRTUAL MACHINE GUEST OPERATING SYSTEM COLLABORATIVE SCSI PATH MANAGEMENT

CROSS REFERENCE TO RELATED APPLICATIONS

The subject matter of this application is related to that of commonly owned patent application Ser. No. 12/689,162, entitled "Method for Configuring a Physical Adapter with Virtual Function (VF) and Physical Function (PF) for Controlling Address Translation Between Virtual Disks and Physical Storage Regions," filed on Jan. 18, 2010 (now U.S. Pat. No. 8,473,947, Issued Jun. 25, 2013). The subject matter of this application is related to that of commonly owned patent application Ser. No. 12/689,152, entitled "Virtual Target Addressing During Direct Data Access Via VF of IO Storage Adapter," filed on Jan. 18, 2010 (now U.S. Pat. No. 8,239,655, Issued Aug. 7, 2012).

BACKGROUND

The advantages of virtual machine technology have become widely recognized. Among these advantages is the ability to run multiple virtual machines on a single host platform. This can make better use of the capacity of the hardware, while still ensuring that each user enjoys the features of a "complete" computer. An additional benefit of virtualization, in some implementations, is greater security. For instance, virtualization increases security by isolating potentially unstable or unsafe software so that it cannot adversely affect the hardware state or system files required for running the physical (as opposed to virtual) hardware. A virtual machine (VM) is a software abstraction, or "virtualization," of an actual physical computer system. Multiple virtual machines (VMs) can be installed on a physical host machine, referred to as a 'host', which includes physical system hardware. The physical system hardware typically includes one or more physical processors and physical memory and various other physical devices, such as an IO storage adapter to perform protocol conversions required to access a remote storage such as over a shared storage access network (SAN). The virtual system hardware ordinarily includes one or more virtual processors, virtual memory, at least one virtual disk, and one or more virtual devices all of which may be implemented using software to configure physical components of a physical machine to emulate the virtual components. One or more layers of co-resident software components comprising a virtualization intermediary, e.g. a virtual machine monitor (VMM), hypervisor or some combination thereof acts to instantiate and provision VMs and to allocate host resources dynamically and transparently among the VMs so that their respective guest operating systems can run concurrently on a single physical machine.

Physical storage shared among multiple VMs often is emulated so as to present virtual storage resources to the VMs. In some virtualization embodiments, a virtualization intermediary which manages interaction between VMs and physical storage, "traps" (intercepts) virtual storage requests issued by individual VMs and redirects the requests from virtual disks to physical storage regions such as a logical block addresses or sectors of a physical disk, for example. Such earlier virtualization intermediary uses trap handlers during emulation to redirect input/output (IO) commands to prevent storage access violations, for example. This emulation can be expensive in terms of instructions processed. Overall performance may decline when many VMs seek to access physical storage at the same time. The many storage requests can result in data access delays due to the compute cycles required by the virtualization intermediary to trap and translate simultaneous data requests from many VMs.

One solution to this problem has been proposed in the Single Root Virtualization I/O and Sharing Specification, Revision 1.0, Sep. 11, 2007 (PCI SR-IOV) specification. The PCI SR-IOV specification proposes providing each of one or more VMs with direct access to physical storage through its own storage adapter instance as a designated virtual function (VF) running on a physical storage adapter so as to avoid the need for heavy intervention by the virtualization intermediary to gain access to physical storage.

Direct access that bypasses the virtualization intermediary also may bypass certain storage virtualization benefits such as multipath IO capability of a virtualization intermediary. Multipath IO is a fault tolerance and performance enhancement technique in which a physical storage region may be associated with multiple SCSI paths. In general, multipathing provides redundancy and automatic fail-over by providing at least two physical paths to a target resource. Multipathing provides redundancy allowing for re-routing in the event of component failure, enabling higher availability for storage resources. Multipathing also allows for the parallel routing of data allowing increased scalability and faster throughput to overcome network congestion. Multiple paths can be achieved from host or storage controllers having more than one port, redundancy in the fabric, or having multiple controllers or buses (on the target controllers), for example.

In a direct access virtualized storage environment, each SCSI path that associates a virtual disk with a physical storage region is defined by a triplet (initiator, target, LUN). In a virtualized storage environment, multipathing techniques may associate a virtual disk with multiple SCSI paths. A virtual machine configured with multipathing software can select from among multiple SCSI paths to the same given physical storage region. A virtual machine configured with multipath software can leverage redundant paths to provide failover recovery and dynamic load balancing, for example.

Multipathing ordinarily involves the capability to perform SCSI path selection and SCSI path routing across the multiple paths of a high availability shared storage area network (SAN) configured with redundant physical paths between a SCSI initiator and SCSI target. Since in a PCI SR-IOV environment, VMs configured for direct-access to storage typically will be expected to co-exist on the same virtualization intermediary instance with VMs that are not configured for direct-access to physical storage, the direct access and non-direct-access VMs will most likely share the same physical SAN resources provisioned to the virtualization intermediary. However, permitting a direct-access virtual machine to make SCSI path selection and routing decisions can potentially have a detrimental impact upon the non-direct-access virtual machines that rely upon multipathing decisions of the virtualization intermediary. Moreover in keeping with virtual machine isolation and protection requirements, a virtualization intermediary typically operates to not expose the physical SAN to a virtual machine.

SUMMARY

In one aspect, a direct access is provided to a virtual machine (VM) running on a host machine to physical storage via a virtual function (VF) running on an input/output (IO) adapter. A guest driver running within VM memory space shares a memory region with a virtualization intermediary (VI) running within a different memory space allocated to the VI. The virtualization intermediary stores an indication of an active path associated with a virtual storage device to the shared memory region. The guest driver obtains the stored active path indication from the shared memory region. The guest driver dispatches an IO request to the VF that includes an indication of the active path. The VF sends an IO request that includes the indicated active path to physical storage.

In another aspect, a change in an active path associated with a virtual storage device allocated to the VM is identified by a virtualization intermediary running on the host machine. In response to the change, the virtualization intermediary stores an indication of the changed active path to the memory region shared by a guest driver and the virtualization intermediary. The virtualization intermediary sends a notification to the guest driver of the change in active path, and the guest driver obtains the stored indication of the changed active path from the shared memory region.

Therefore, a virtual machine has direct IO access to a physical region of physical storage through an active physical path chosen from among multiple physical paths to such region substantially without intervention of a virtualization intermediary during such direct IO access.

BRIEF DESCRIPTION OF THE DRAWINGS

FIG. 7 is an illustrative drawing showing a first example scenario in which a first table is stored in the guest VF driver cache of the system of FIG. 3.

FIG. 8 is an illustrative drawing showing a second example scenario in which a second table is stored in the guest VF driver cache of the system of FIG. 3.

FIG. 9 is an illustrative drawing showing additional details of the second example scenario in which a third table is stored in the shared memory of the system of FIG. 3.

FIG. 10 is an illustrative drawing showing a third example scenario in which a fourth table is stored in the guest VF driver cache of the system of FIG. 3.

FIG. 11 is an illustrative drawing showing additional details of the third example scenario in which a fifth table is stored in the shared memory of the system of FIG. 3.

DETAILED DESCRIPTION OF THE EMBODIMENTS

The following description is presented to enable any person skilled in the art to create and use a computer system configured for use with an SR-IOV adapter in which a direct-access virtual machine and a virtualization intermediary collaborate in use of multipathing to select a SCSI path for access to a physical storage region. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

In this description, reference is sometimes made to a virtual machine, a hypervisor kernel, virtual machine monitors (VMMs), a virtualization intermediary or some other virtualized component taking some action. Persons skilled in the art will appreciate that a hypervisor kernel, VMMs and a virtualization intermediary comprises one or more software layers that run on a host system, which comprises of hardware and software. In order to perform any given action, a virtual machine, virtualization intermediary or other virtualized component configures physical resources of the host machine to perform the given action. For example, a virtualization intermediary may configure one or more physical processors, according to machine readable program code stored in machine readable storage device.

Overview of Virtualization

Figure 1:
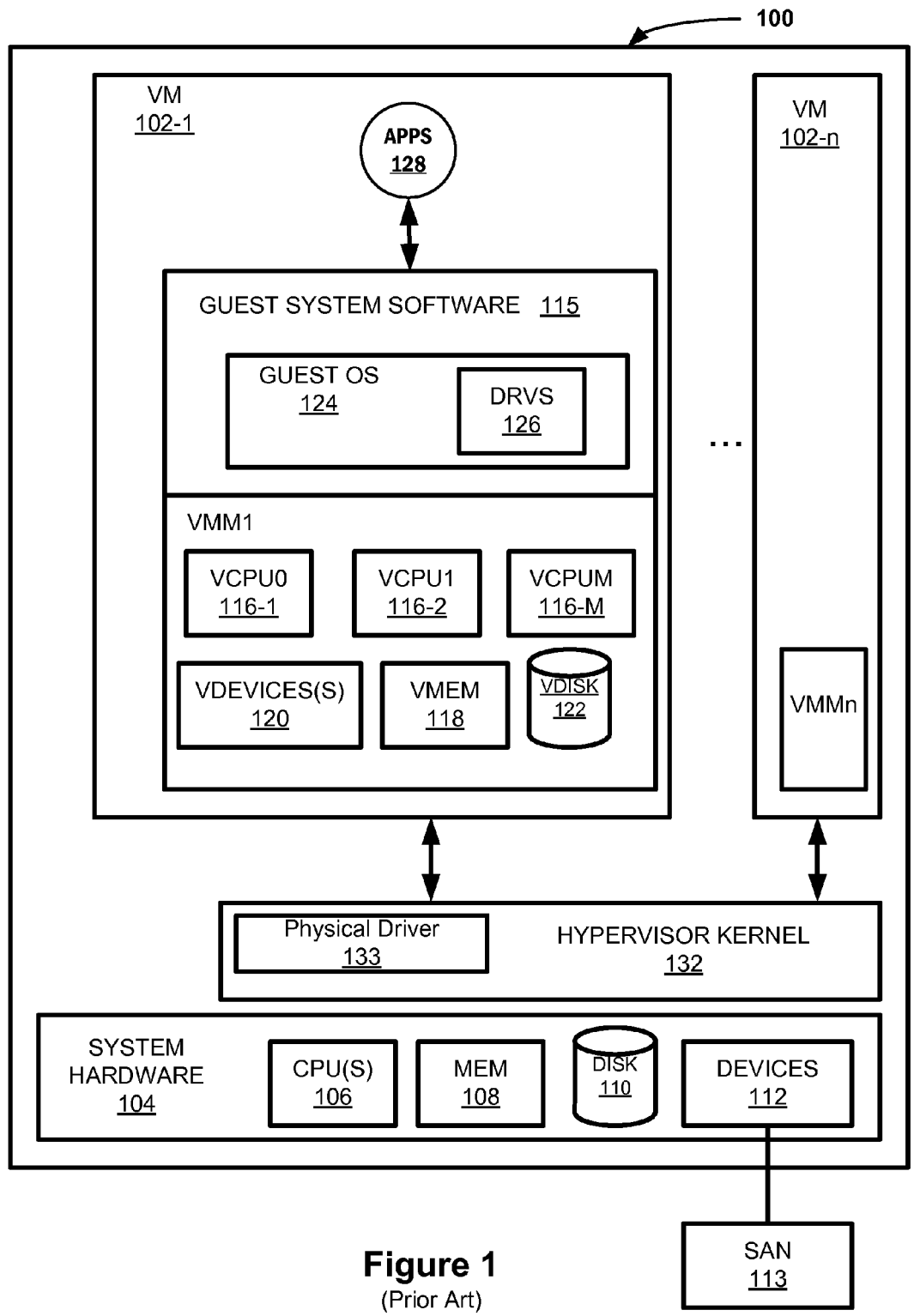
FIG. 1 is an illustrative drawing showing one possible arrangement of a computer system that implements virtualization.

FIG. 1 is an illustrative drawing showing one possible arrangement of a computer system 100 that implements virtualization. In the example system of FIG. 1, multiple virtual machines (VMs) or "guests" VM1 to VMn are installed on a "host platform," referred to as a "host," which includes system hardware, that is, hardware platform 104, and one or more layers of co-resident software components comprising a virtualization intermediary, e.g. a virtual machine monitor (VMM), hypervisor or some combination thereof. The system hardware typically includes one or more physical processors 106, physical memory 108, some form of mass storage 110, and various other physical devices 112, such as an IO storage adapter to perform protocol conversions required to access remote storage such as within a storage access network (SAN) 113 and to coordinate concurrent accesses to such storage.

Each virtual machine VM1 to VMn typically will have both and guest system software 115 and virtual system hardware, which typically includes one or more virtual CPUs (VCPUs) 116-1 to 116-$m$, virtual memory 118, at least one virtual disk 122, and one or more virtual devices 120. The virtual hardware components of the virtual machine may be implemented in software using known techniques to emulate the corresponding physical components. The guest system software includes guest operating system (OS) 124 and virtual drivers 126 as needed for the various virtual devices 120.

As is well known to persons skilled in the art, a typical device driver is a computer program based component that runs on (i.e. configures) a machine (e.g. host computer) and acts as a translator between a physical device and the applications or operating systems that use the device. A device driver typically accepts generic high-level commands and breaks them into a series of low-level device-specific commands as required by the device being driven. A virtual driver 126 is a computer program based component that that runs on a host computer and performs the same role as a physical driver except that it configures a machine (e.g. host computer) to provide translation between a virtual device 120 that provides hardware emulation and that runs within the VMM and the guest operating system 124. Furthermore, drivers (virtual or physical) can provide a level of security as they can run in kernel-mode, thereby protecting the operating system from applications running in user-mode.

In many cases, software applications 128 running on a virtual machine VM1 will function as they would if run on a "real" computer, even though the applications are running at least partially indirectly, that is via guest OS 124 and virtual processor(s). Executable files will be accessed by the guest OS from virtual disk 122 or virtual memory 118, which will correspond to portions of an actual physical disk 110 or storage on the SAN 113 or memory 108 allocated to that virtual machine.

A software component referred to herein as a 'virtualization intermediary' serves as an interface between the guest software within a virtual machine and the various hardware components and devices in the underlying hardware platform. The virtualization intermediary may include VMMs, hypervisor (also referred to as a virtualization "kernel") or some combination thereof. Because virtualization terminology has evolved over time and has not yet become fully standardized, these three terms do not always provide clear distinctions between the software layers and components to which they refer. In some systems, some virtualization code is included in at least one "superior" virtual machine to facilitate the operations of other virtual machines. Furthermore, specific software support for virtual machines may be included in the host OS itself. For example, the term 'hypervisor' often is used to describe both a VMM and a kernel together, either as separate but cooperating components or with one or more VMMs incorporated wholly or partially into the hypervisor itself to serve as a virtualization intermediary. However, the term hypervisor also is sometimes used instead to mean some variant of a VMM alone, which interfaces with some other software layer(s) or component(s) to support the virtualization.

One use of the term hypervisor signifies a software layer implemented to manage physical resources, process creation, I/O stacks, and that includes physical device drivers 133 (only one shown) that serve as an interface to host system devices such as such as an IO storage adapter. Under such an implementation, the hypervisor 132 would manage the selections of physical devices and their temporary assignment to virtual devices. For example, the hypervisor kernel 132 would manage the mapping between VM1-VMn and their virtual processors 116-1 to 116-m, virtual memory 118, and the physical hardware devices that are selected to implement these virtual devices. More particularly, when a virtual processor is dispatched by a VM, a physical processor, such as one of the physical processors 104, would be scheduled by the hypervisor 132 to perform the operations of that virtual processor. In contrast, in the context of such implementation, VMM1-VMMn might be responsible for actually executing commands on physical processors, performing binary translation (BT) or programming of virtual hardware, for example. Note that the VMM is 'instanced' meaning that a separate instance of the VMM is created for each VM. Thus, although in this example, such a hypervisor and a VMM may be distinct, they would work together as a virtualization intermediary. Unless otherwise indicated, the term 'virtualization intermediary' encompasses any combination of VMM and hypervisor (or hypervisor kernel) that provides a virtualization layer between a guest OS running on VMs and the host hardware.

In the system of FIG. 1, the virtual machine monitors VMM1 to VMMn are shown as separate entities from the hypervisor kernel software 132 that run within VM1 to VMn, respectively. The VMMs of the system of FIG. 1 emulate virtual system hardware. While the hypervisor kernel 132 is shown as a software layer located logically between all VMs and the underlying hardware platform and/or system-level host software, it would be possible to implement at least part of the hypervisor layer in specialized hardware. The illustrated embodiments are given only for the sake of simplicity and clarity and by way of illustration since as mentioned above, the distinctions are not always so clear-cut. Again, unless otherwise indicated or apparent from the description, it is to be assumed that one or more components of the virtualization intermediary can be implemented anywhere within the overall structure of such virtualization intermediary, and may even be implemented in part with specific hardware support for virtualization.

The various virtualized hardware components of the VM1, such as VCPU(s) 116-1 to 116-m, virtual memory 118, virtual disk 122, and virtual device(s) 120, are shown as being emulated within VMM1, which runs within virtual machine VM1. One advantage of such an arrangement is that the virtual machine monitors VMM1 to VMMn may be set up to expose "generic" devices, which facilitate VM migration and hardware platform-independence. For example, the VMM1 may be set up to emulate a standard Small Computer System Interface (SCSI) disk, so that the virtual disk 122 appears to the VM1 to be a conventional SCSI disk connected to a conventional SCSI adapter, whereas the underlying, actual, physical disk 110 may be something else. The term "disk" typically signifies persistently stored data addressed in sequence, typically from address zero to address max capacity-1. In that case, a conventional SCSI driver typically would be installed into the guest OS 124 as one of the virtual drivers 126. A virtual device 120 within the VMM then would provide an interface between VM1 and a physical device driver 133 that within the hypervisor kernel 132 that serves as an interface to a physical device (e.g., device 112) that is part of the host system and would handle disk operations for the VM1.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest OS other than those that would be found in a non-virtualized computer; thus, the guest OS 124 could be an off-the-shelf, commercially available OS with no components included specifically to support use in a virtualized environment.

In contrast, another term, which has yet to achieve a universally accepted definition, is that of "para-virtualization." As the term implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, some para-virtualized systems include an interface within the guest that enables explicit calls to other components of the virtualization software.

For some, the term para-virtualization implies that the guest OS (in particular, its kernel) is specifically designed to support such an interface. Others define the term para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, embodiments are not restricted to use in systems with any particular "degree" of virtualization and are not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration. In a hosted virtualized computer system, an existing, general-purpose operating system forms a "host" OS that is used to perform certain input/output (I/O) operations, alongside and sometimes at the request of the VMM.

The system of FIG. 1 is an example of a non-hosted configuration in which VMMs are deployed on top of a software layer—hypervisor kernel 132—constructed specifically to provide an interface for the virtual machines. Kernel 132 also may handle any other applications running on it that can be separately scheduled, as well as a console operating system that, in some architectures, is used to boot the system and facilitate certain user interactions with the virtualization software.

PCI SR-IOV

Many modern computing devices employ input/output (IO) adapters and buses that utilize some version or implementation of the Peripheral Component Interconnect (PCI) standard, which specifies a computer bus for attaching peripheral devices to a computer motherboard. PCI Express (PCIe) is an implementation of the PCI computer bus that uses existing PCI programming concepts, but bases the computer bus on a different and much faster serial physical-layer communications protocol. In addition to the PCI and PCIe specifications, the PCI-SIG has defined input/output virtualization (IOV) standards for defining how to design an IO adapter that can be shared by several virtual machines.

The term "function" is used in the PCI context to signify a device with access controlled by a PCI bus. A PCI function is identified within a single PCI root complex by its PCI or PCIe bus, device, and slot identifiers. A PCI function includes a configuration space, which includes both device dependent and device independent regions used by host software to support device relocation on the PCI bus, flexible device-to-interrupt binding, device identification, and device configuration. A function also includes memory space which is identified by Barrier Address Registers in configuration space and provides a memory mapped IO interface for host IO initiated from host to the device. A PCIe function also includes message space which is identified by MSI and MSI-X capabilities in configuration space and provides either or both MSI/MSI-X message based interrupt generation. Many network (e.g., Ethernet) and storage (e.g., disk) adapters are implemented as PCI or PCIe compliant adapters and are recognized by a machine's PCI sub-system as a single PCI function. Multi-port PCI or PCIe adapters simply appear to a host PCI sub-system as multiple PCI functions.

Figure 2:
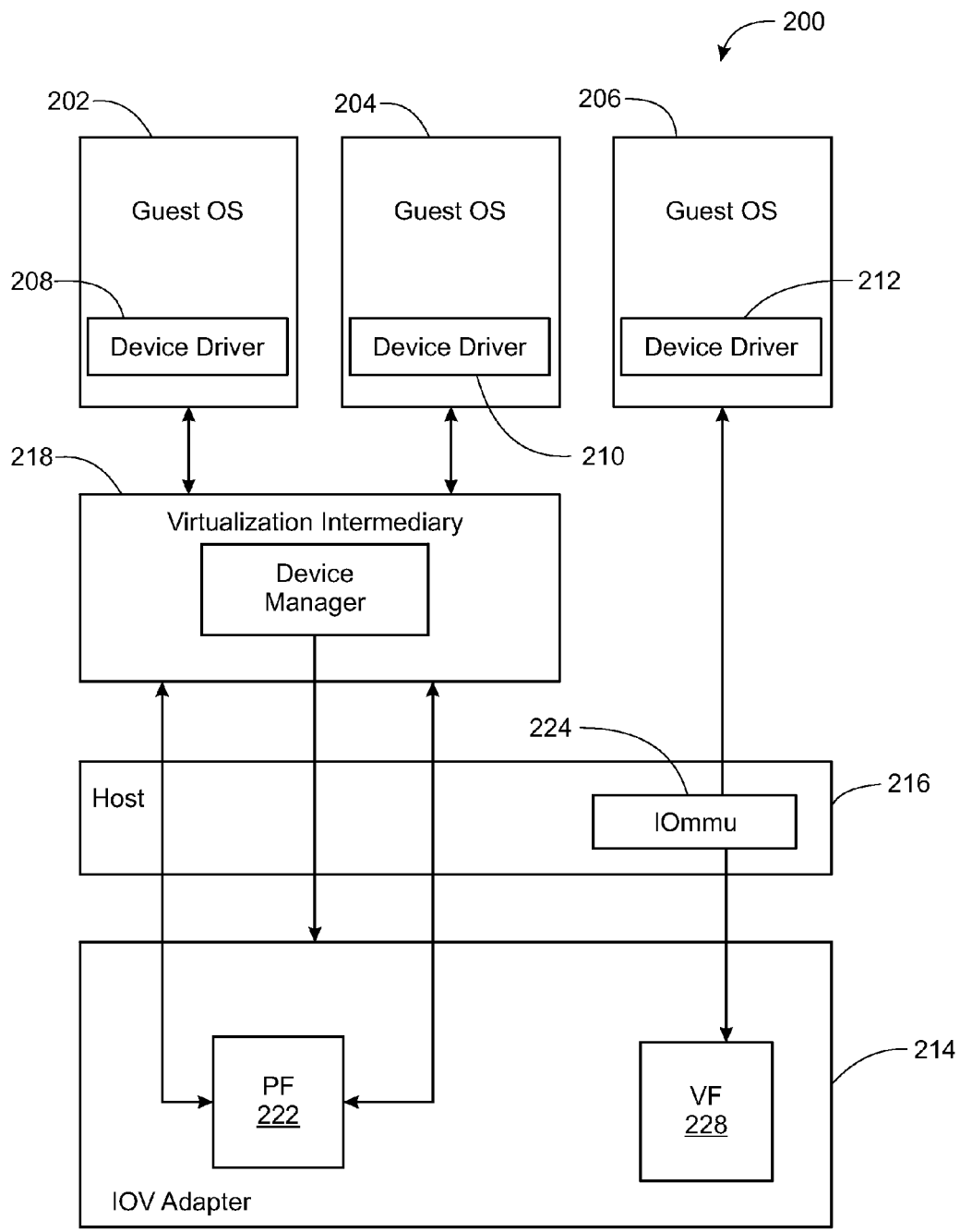
FIG. 2 is an illustrative drawing of a virtualized system including SR-IOV virtualization.

FIG. 2 is an illustrative drawing of a virtualized system 200 including SR-IOV virtualization. Techniques specified in the PCI SR-IOV specification can be used to reduce the CPU impact of high throughput workloads by bypassing the virtualization intermediary. The term 'single root' refers to a single root complex as contrasted with a multiple root complex. In a PCI Express system, a root complex device couples the processor and memory subsystem to a PCI Express switch fabric comprised of one or more switch devices. The root complex generates transaction requests on behalf of the processor, which is interconnected through a local bus.

The illustrative system includes VMs 202 and 204, each independently running a separate (and possibly different) guest operating system. A virtualization intermediary layer 218 runs between the virtual machines 202-206 and a host machine 216. Device driver 208 of VM 202 and device driver 210 of VM 204 each drive a physical function (PF) 222, with intervention by the virtualization intermediary 218. Device driver 212 of VM 206 drives the virtual function (VF) 228, without intervention by the virtualization intermediary 218. The device driver 212 communicates with IO MMU logic 224 disposed on the host machine 216 in the course of data access to data with mass storage (not shown). A device manager 220 within virtualization intermediary 218 manages the allocation and de-allocation of VFs for the SR-IOV adapter 214. The IOV adapter 214 provides a memory-mapped input/output interface for IO and provides an interface for controlling VFs.

A typical IOV adapter includes processor, memory and network interface resources (not shown) to implement the PF and one or more virtual functions VFs. A PF is a PCIe function that supports the SR-IOV capabilities defined in the PCI SR-IOV specification. A PF is used to control the physical services of the device and to manage individual VFs.

A VF is a PCIe function which is associated with a particular physical function and shares physical PCI adapter resources (e.g., ports, memory) with that physical function and other virtual functions located on the same physical adapter. A virtual function has its own PCI configuration space, memory space, and message space separate from other physical or virtual functions on that same adapter. A physical function, such as PF 222 in this example that is associated with a virtual function 228 is responsible for allocating, resetting, and de-allocating that virtual function and the PCI resources required by that virtual function. In general, a VF can either be accessed via a virtualization intermediary or bypass the virtualization intermediary to be directly accessed by a guest OS. In the example system 200, VMs 202, 204 respectively access PF 222 via the virtualization intermediary 218, and VM 206 accesses VF 214 directly, i.e. without the virtualization intermediary 218. Thus, a VF can be a direct sink for I/O and memory operations of a VM, i.e., without run-time intervention by a virtualization intermediary. The VF also can be a source of Direct Memory Access (DMA), completion, and interrupt operations to a VM.

SCSI Command Protocol

The International Technology Standards (INCITS) T10 Technical Committee has adopted a layered approach that divides the Small Computer System Interface (SCSI) into multiple layers of standards. The lowest layer refers to physical interfaces sometimes referred to as physical transports. The next layer up pertains to transport protocols usually directly associated with one physical transport standard. The top layer consists of command sets associated with specific devices such as disk drives or tape drives, for example. See, J. Lohmeyer, SCSI Standards Architecture, Business Briefing: Data Management & Storage Technology 2003. A result of this layered approach to the SCSI standard is that there are over 30 SCSI standards. In general, only a few of these standards apply to a given product. As used herein, the term 'SCSI' signifies compliance with one or more of these SCSI standards.

A SCSI command is a request describing a unit of work to be performed by a device server. A SCSI command descriptor block (CDB) is a structure used to communicate commands from an application client to a device server. The SCSI command set assumes an underlying request-response protocol. The fundamental properties of the request-response protocol are defined in SCSI Architecture Model (SAM)-3, Revision 14. Action on SCSI commands is not be deemed completed until a response is received. The response ordinarily includes a status that indicates the final disposition of the command. See, SCSI Primary Commands-3 (SPC-3), Revision 23, Section 4.2, The request-response model, May 4, 2005, American National Standards for Information Systems—InterNational Committee for Information Technology Standards. (hereinafter "SPC-3, Revision 23")

A SCSI device is a device that contains one or more SCSI ports that are connected to a service delivery subsystem and supports a SCSI application protocol. An application client is an object that is the source of SCSI commands. A SCSI initiator device is a SCSI device that contains application clients and SCSI initiator ports that originate device service and task management requests to be processed by a SCSI target device and receive device service and task management responses from SCSI target devices. A SCSI initiator port is a SCSI initiator device object that acts as the connection between application clients and the service delivery subsystem through which requests and responses are routed. A SCSI target device is a SCSI device containing logical units and SCSI target ports that receive device service and task management requests for processing and sends device service and task management responses to SCSI initiator devices. A SCSI target port is a SCSI target device object that acts as the connection between device servers and task managers and the service delivery subsystem through which requests and responses are routed. A logical unit is an externally addressable entity within a SCSI target device that implements a SCSI device model and contains a device server. See, SPC-3, Section 3.1 Definitions.

For the purpose of the following description, it is assumed that the IO storage adapter described herein employs a port based SCSI transport protocol, such as Fiber Channel, iSCSI or SAS, to transfer data between a host system IO bus and SCSI storage. In accordance with the iSCSI transport protocol, for example, a SCSI initiator is responsible for packaging a SCSI CDB perhaps with the aid of a machine's operating system and sending the CDB over an IP network. An iSCSI target receives the CDB and sends it to an iSCSI logical unit, which may be a disk, CD-ROM, tape drive, printer, scanner or any type of device, managed by a SCSI target. The SCSI target sends back a response to the CDB that include a status that indicates the final disposition of the command.

A SCSI target may manage numerous SCSI logical units. In some embodiments, a SCSI target identifier in combination with a SCSI LUN (logical unit number) and a Logical Block Address (LBA) constitutes a storage address. A separate parameter indicates the size of the storage region located at the specified storage address in terms of the number of contiguous blocks associated with the address. A SCSI LUN, serves as an instance identifier for a SCSI logical unit that uniquely identifies a SCSI logical unit within the scope of a given SCSI target at a given time. A SCSI LBA is the value used to reference a logical block within a SCSI logical unit.

IOV with Virtual Storage on Fast Access Data Path

Figure 3:
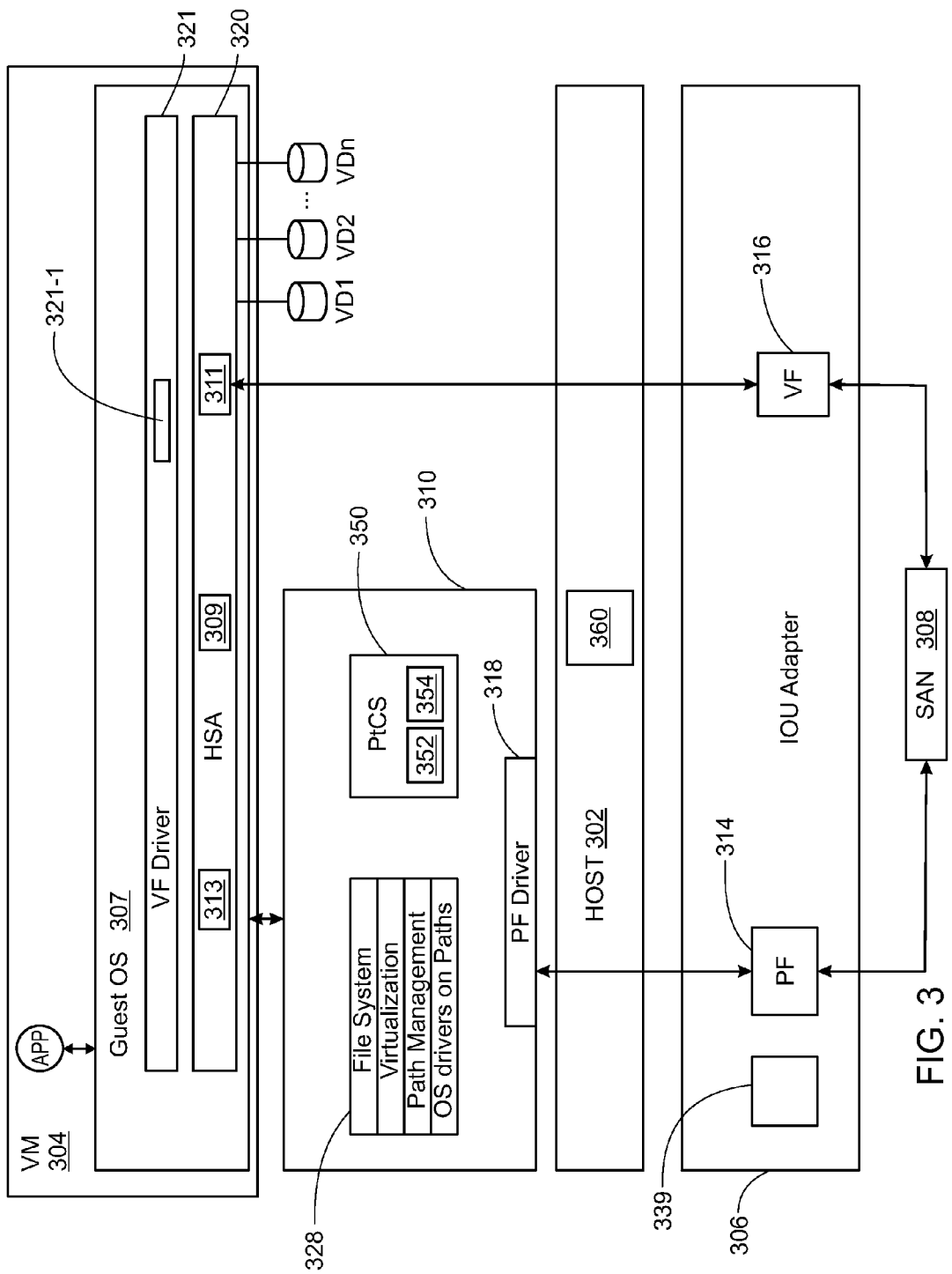
FIG. 3 is an illustrative drawing of a system that includes a host machine that hosts a virtualization intermediary and a virtual machine and that is coupled to access physical storage through an IOV adapter.

FIG. 3 is an illustrative drawing of a system 300 that includes a host machine 302 that hosts a virtual machine 304 and that is coupled to an IOV storage adapter 306 that adapts IO communications over a PCI bus protocol of the host machine 302 to SCSI storage access protocols used to access persistent physical storage 308. The system 300 of FIG. 3 is an implementation that in general possesses much the same general type of configuration and component structures explained with reference to FIG. 1 except that VM 304 is configured for direct-access to physical storage via the IOV storage adapter 306 in accordance with the PCI SR-IOV specification. However, details are omitted from FIG. 3 so as to not obscure IOV features.

In some embodiments the PCI bus protocol is compliant both the PCI specification and the PCIe SR-IOV extension specification, and SCSI commands are used with one or more SCSI transport protocols such as iSCSI, SAS or Fibre Channel to directly communicate IO access requests (Read/Write) with persistent physical storage 308 such as SAN storage, for example. More particularly, the system 300 is configured to allow a virtual machine 304 to access physical storage 308 via IOV direct access for certain SCSI Read/Write CDBs and to allow access to physical storage 308 via a virtualization intermediary 310 for other SCSI CDBs. Specifically, certain frequently occurring Read and Write SCSI commands are directed over a direct IOV data path coupling between the virtual machine 304 and a virtual function 316 substantially without involvement of the virtualization intermediary 310.

The storage adapter 306 includes adapter resources 339 such as processor and memory resources and network protocol translation and interface resources, which will be readily understood by persons skilled in the art, to implement a physical function (PF) 314 and the virtual function (VF) 316. In the illustrated embodiment, the VF 316 is associated with virtual machine 304. A guest VF driver 321 communicates information with both the VF 316 and a hybrid storage adapter (HSA) 320 instantiated within the virtual machine 304. Although only one VM 304 and one corresponding VF 316 are shown and described herein, it will be appreciated that the host system 302 may host multiple VMs and the adapter 306 may implement multiple corresponding VFs, and the description herein would apply to each such combination of VM and VF. Multiple VFs (only one shown) may be instantiated within the adapter 306, and each respective virtual machine (only one shown) may be associated with a different respective VF to create respective IOV data paths for certain frequently occurring Read and Write SCSI commands.

The HSA 320 'appears' to be a physical PCI device (i.e. a storage adapter) from the perspective of the virtual machine 304. The HSA 320 acts as the virtual machine's interface to the physical storage world, i.e. to the physical storage adapter 306. The hybrid storage adapter is an emulated PCI storage adapter within the VM 304, which encapsulates a PCI SR-IOV virtual function of an SR-IOV compliant physical storage adapter presented by the virtualization intermediary 310 within a protected memory space of the virtual machine. A PCI configuration space 309 of the virtual function 316 is copied to the HSA's PCI configuration space, so as to provide a memory mapped interface to the first HSA PCI memory space 311 that supports direct access to physical memory. The HSA 320, through the first PCI memory space, provides a direct access path to the guest OS 307 of the virtual machine 304 with the capability to issue IO requests directly to the physical adapter virtual function (VF) 316 without intervention by the virtualization intermediary 310. In addition, the HSA's PCI configuration space maps to the second HSA PCI memory mapped interface 313 that supports fully emulated processing of certain SCSI commands using the virtualization intermediary 310. Although the HSA 320 is shown resident within a protected memory space of the virtual machine 304, it will be appreciated that it could instead reside within the virtualization intermediary 310.

The guest VF driver 321 is savvy as to the hybrid nature of the HSA 320, and as such is a 'para-virtual' device driver. The guest VF driver 321 directs certain SCSI I/O operations to the first HSA PCI memory space 311 for direct access to physical storage 308 via the VF. The guest VF driver 321 directs other SCSI operations to the second HSA PCI memory space 313 for fully emulated processing by the virtualization intermediary 310.

Furthermore, for each physical SCSI disk exposed to the VF 316 on the physical SAN 208, there may be multiple physical SCSI paths existing to the physical SCSI disk of which only a subset may be active at any point in time. A path management layer in the storage stack 328 within the virtualization intermediary collapses or coalesces the multiple paths into a single logical device (not shown). For each respective logical device, a virtual disk (e.g., $V_{D1}$, $V_{D2}$, ... $V_{Dk}$) is provisioned to the VM 304 as being attached to the HSA 320 at a respective virtual SCSI address. While issuing IO requests to the physical SCSI disk via the VF 316 it is this virtual SCSI address that needs to be mapped to the actual physical SCSI address represented by a currently active path.

The storage stack 328 within the virtualization intermediary 310 provides IO services. A file system 328-1 issues an IO request for a virtual disk to a virtualization layer 328-2, which converts the request to an equivalent request for physical disks or LUNs. Typically, a path management layer 328-3 receives the request from the virtualization layer 328-2 and determines which path should handle the request and issues a request to a SCSI system driver 328-4 on the determined path. The SCSI system driver (which may be the PF driver 318, for example) converts IO request to a SCSI CDB and sends and receives CDBs and data on a storage network or IO bus.

The multipathing layer 328-3 in the storage stack 328 performs several functions. These include discovery of the physical paths to SCSI devices, collapsing multiple physical paths to a SCSI device, keeping track of the active path to a SCSI device, ensuring that IO coming from the software layers above it is routed to the correct path for a SCSI device, and changing the active path based on certain path selection and/or load balancing policies, for example.

A passthrough control service module (ptCS) 350 within the virtualization intermediary 310 includes a callout service 352 and a callback service 354 to permit communication between the multipathing layer 328-3 and the HSA 320 in order to provide the guest VF driver 321 with the necessary physical device attributes (i.e. current active path information) required for IO dispatch. The callout service 352 makes calls to the multipathing layer 328-3 to request identification of the current active path to a given specific physical device. The callback service 354 registers to receive callbacks from the multipathing layer 328-3 to report active path change events to the guest VF driver 321.

A cache storage 321-1 associated with the guest driver 321 stores active path information for virtual storage devices recently accessed by the guest driver 321. Moreover, a memory region 360 within the host system 302 that is between the virtualization intermediary 310 and the guest driver 321 is used to communicate active path changes from the virtualization intermediary 310 to the guest driver without the need for a memory context change which could be expensive in terms of instruction cycles. It will be understood that during runtime, the virtualization intermediary 310 runs in a 'vmkernel' address space, and the guest VF driver 321 runs in the context of a VCPU of the VM 304 and in the guest operating system address space. That is, the virtualization intermediary 310 runs in a 'vmkernel' address space of the host system 302 that is generally different from an address space of the guest operating system 307 in which a VCPU of VM 304 runs. However, these two different address spaces do overlap somewhat in that they share the shared memory region 360 to which the virtualization intermediary 310 stores indications of active path changes associated with a given virtual storage device and from which the VM 304 obtains indications of active path changes for such virtual storage devices.

The ptCS module 350, which runs within the virtualization intermediary 310 can update the shared memory 360 with the current active path information for physical regions that correspond to virtual storage devices $V_{D1}$ to $V_{Dk}$ provisioned to the VM 304 as communicated by the multipathing layer 328-3 via either the callout service 352 or callback service 354. The guest driver 321 accesses the shared memory 360 in the context of the virtual machine's VCPU thread, which blocks out other VCPUs during such accesses via a guest-level lock. Thus, active path updates are transferred through the shared memory 360.

In some embodiments, the virtualization intermediary 310 is implemented as the 'ESX' hypervisor produced by VMware, Inc. having a place of business in Palo Alto, Calif. The ESX hypervisor serves as a virtualization intermediary having both VMM and hypervisor functionality. Each VM (e.g. virtual machine 304) runs on top of ESX. In an ESX environment, a portion of each VM comprises a VMM. That is, VMMs are embedded in the VM's address space, albeit in a protected region. In some embodiments, the hybrid storage adapter 320 also resides in a protected memory space of the VM, and more particularly, runs within the context of the VMM that is embedded in that VM's memory space. If a given VM has multiple virtual processors (VCPUs), then each virtual processor has an associated VMM. In an ESX environment, the VMM/hypervisor virtualization intermediary serves as the primary memory management component to manage multiple simultaneously running VMs.

Provisioning and Instantiation of Virtualized Compute Resources for IOV

Figure 4A:
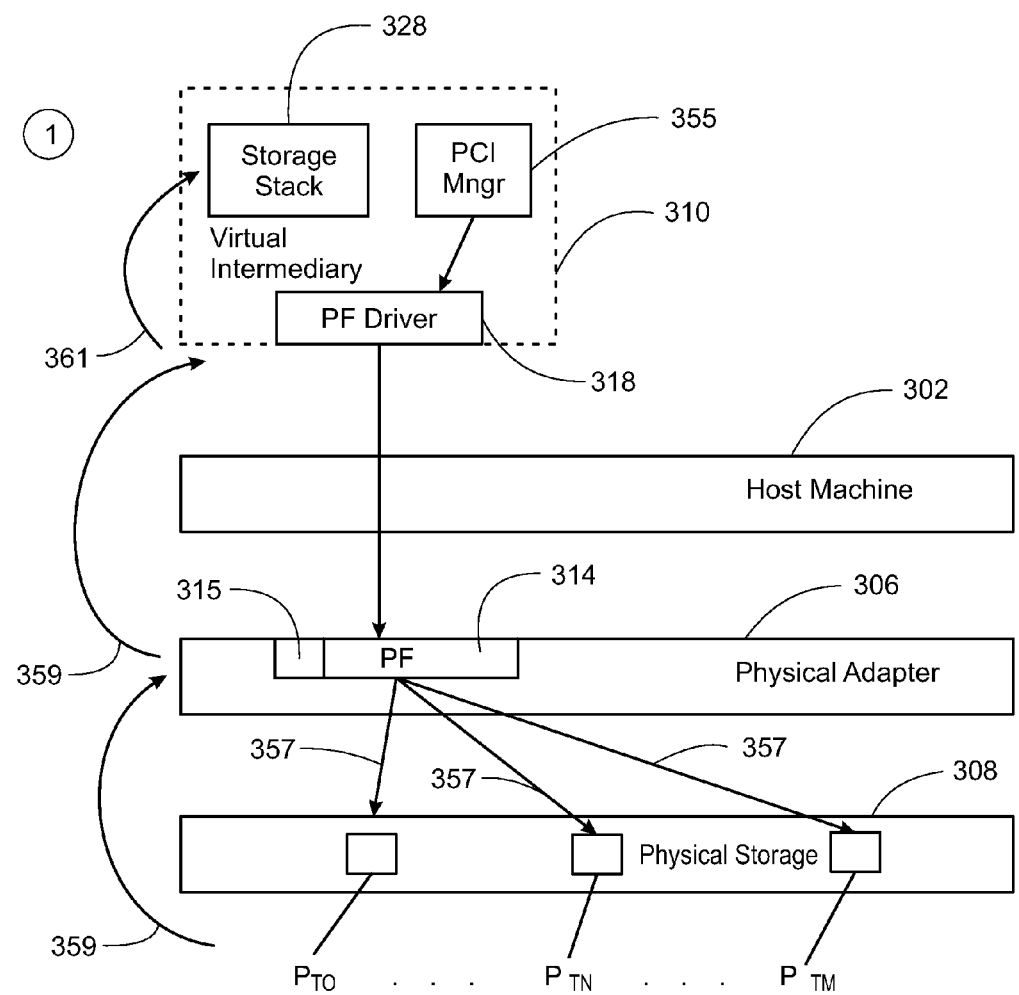
FIGS. 4A-4C are illustrative drawings that show a process to provision and instantiate the virtualized computer resources of the system of FIG. 3.
Figure 4B:
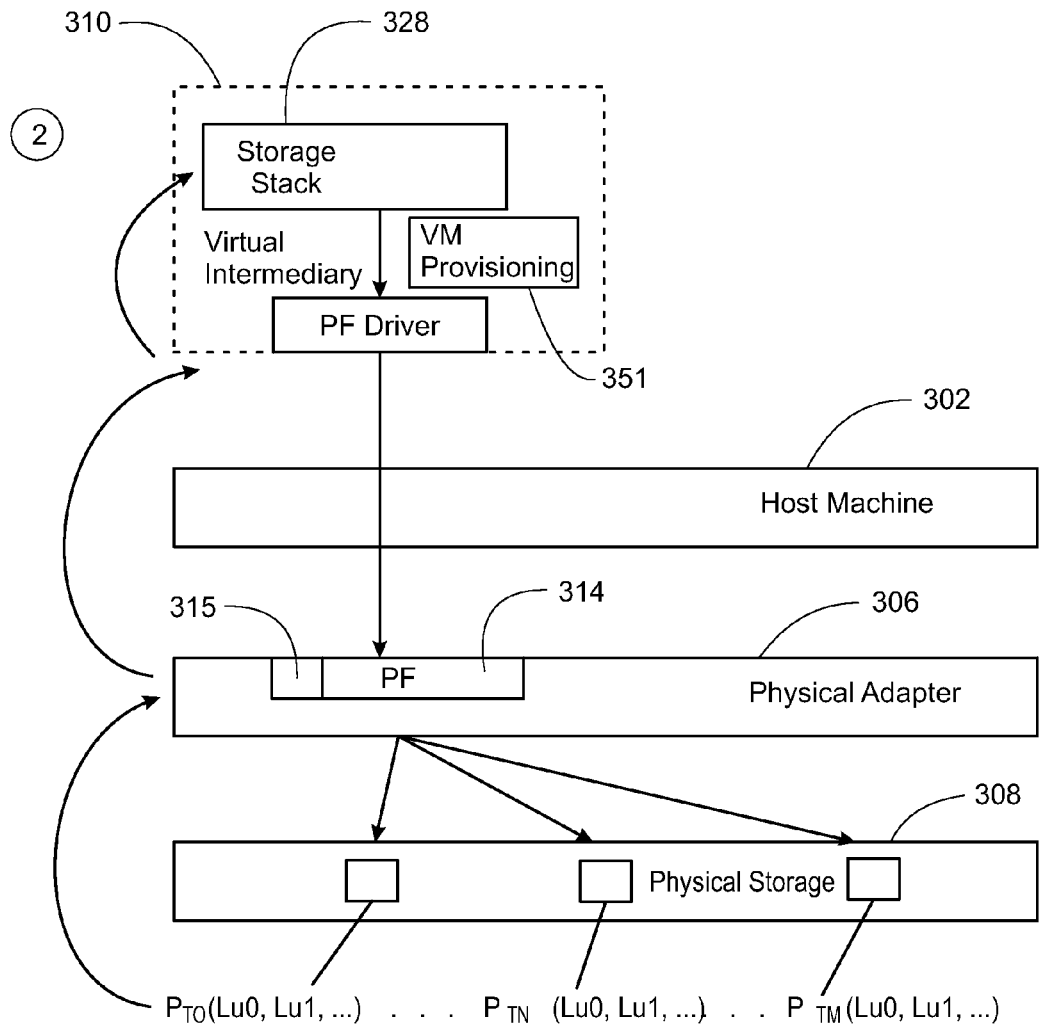
Figure 4C:
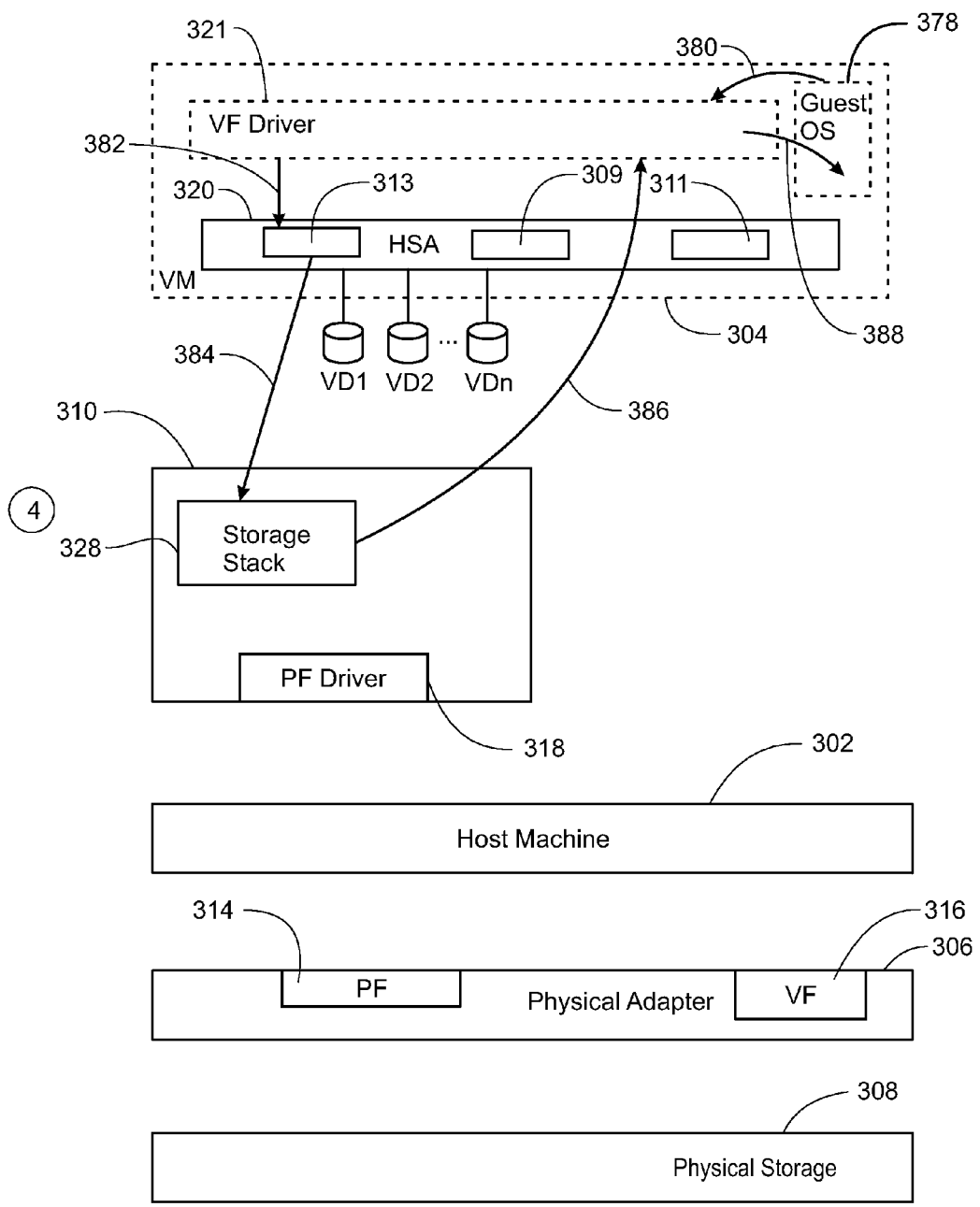

FIGS. 4A-4C are illustrative drawings that show a process to provision and instantiate the virtualized computer resources of the system 300 of FIG. 3. Dashed lines are used in these drawings to represent components that are in the process of being instantiated. Solid lines are used to represent components that already have been instantiated. Arrows represent flow of control or information. Certain components in FIGS. 4A-4C shown above the host 302 represent a virtual machine 304 and the virtualization intermediary 310 configuring the host machine 302 according to machine readable program code stored in machine readable storage device to perform specified functions of the components. Each of the drawings of FIGS. 4A-4C represents a different stage of the provisioning and instantiating of the virtualized computer resources the system 300 of FIG. 3

Referring to FIG. 4A, in the course of instantiating the virtualization intermediary 310, a known PCI manager routine 355 scans the PCI bus (not shown) of the host machine 302 and discovers the physical SR IOV hardware bus adapter (SR IOV adapter) 306 as a valid PCI device and invokes all registered PCI compliant drivers until one driver claims the SR IOV adapter 306. In this case, PF driver 318 claims the SR IOV adapter 306 and discovers a PCIe function of the discovered device to be a physical function (PF) 314, which is indicated by SR-IOV capabilities specified in the PF function's PCI configuration space 315.

After claiming the storage adapter's PF, the PF driver 318 obtains attribute information from the physical adapter 306 via the PF 314 such as the number of SCSI initiator ports and the speed of these ports. The PF driver 318 also discovers physical SCSI target ports and attempts to establish connections indicated by arrow 357 through the PF 314 with these using SCSI transport protocol dependent mechanisms, such as Fiber Channel, iSCSI and SAS, for example. Through these connections, the PF driver 318 learns of possible connections to physical SCSI targets represented by arrows 359. In this illustrative example, the PF driver 318 learns of physical targets $P_{T0}$, to $O_{TN}$ and $P_{TN}$ to $P_{TM}$ through these connections 359. The PF driver 318 passes identifying information, concerning the discovered physical SCSI targets up to storage stack 328 via 361.

Referring to FIG. 4B, the multipathing layer 328-3 of the storage stack 328 probes the SCSI bus via the PF driver 318 and PF 314 for paths associated with physical storage 308 by sending SCSI commands to all possible SCSI logical units on all discovered physical SCSI targets. In this example, the storage stack learns of physical SCSI logical units $P_{T0}$(LU0, LU1, ... ) to, $P_{TN}$(LU0, LU1, ... ) to $P_{TM}$(LU0, LU1, ... ). In this manner, the multipathing layer 328-3 learns of redundant physical SCSI paths to reach all discovered physical SCSI logical units. A unique SCSI path can be defined in terms of a unique combination, a three-tuple, comprising (SCSI initiator, SCSI target, SCSI LUN). With regard to IO requests over the VF 316, each physical path that associates a virtual disk with a physical storage region is defined by the triplet (virtual SCSI initiator, physical SCSI target, physical LUN). During runtime, roles of the multipathing layer 328-3 may include handling physical SCSI transport connection errors through failover and performing path optimization, for example.

Now that the virtualization intermediary 310 (i.e. storage stack 328) has learned of the physical storage resources, virtual storage resources are created, allocated and mapped to the physical storage resources. Each virtual storage device has a one-to-one mapping to a physical storage region. More particularly, for example, a VM provisioning utility 351, which may be a part of the virtualization intermediary 310, creates virtual disks. In the illustrated example, virtual disks $V_{D1}, V_{D2} \ldots V_{Dk}, \ldots$ are created. The VM provisioning utility maps the newly created virtual disks to discovered physical logical units (i.e. to physical storage regions). For example, $V_{D1}$ may be mapped to $P_{T0}$(LU0); $V_{D2}$ may be mapped to $P_{T0}$(LU1); and $V_{Dk}$ may be mapped to $P_{TM}$(LU0). In the course of an IO dispatch, described below, the virtual storage device identifier is used to identify a corresponding physical storage device. Moreover, as explained below, multipathing layer 328-3 provides current active path information for the corresponding physical storage region. It will be appreciated that although different virtual disk is mapped to different physical storage regions, there may be multiple paths associated with one or more of those storage regions, and the active path associated with a given physical storage region may change from time to time.

The virtual disk creation process typically also involves the creation of the file system 328-1 and a logical volume manager (not shown) to track allocated regions of physical storage of multiple physical SCSI logical units across multiple virtual disk files on that file system. The physical-to-virtual mapping may be as small as an addressable SCSI logical block. See, SCSI Block Commands-3 (SBC-3), Revision 15, Section 4.4 Logical Blocks, May 13, 2005, American National Standards for Information Systems—InterNational Committee for Information Technology Standards, (hereinafter "SBC-3, Revision 15").

Still referring to FIG. 4C, in the course of instantiation of virtual compute resources for virtual machine 304, the virtualization intermediary 310 creates virtual hardware resources for the virtual machine 304 such as one or more virtual CPUs (not shown), virtualized memory (not shown), a virtualized PCI bus (not shown) and one or more virtual PCI devices including a hybrid storage adapter (HSA) 320.

As part of the instantiation of the HSA 320, a VF 316, a virtual port (not shown), and an MSI or MSI-X interrupt vector (not shown) are allocated/reserved. The VF 316 is "bound" to both the virtual port and the interrupt vector. In order to utilize existing SAN and SCSI target access control mechanisms (e.g., FC zoning and SCSI target based LUN masking) for authorization of IO from different VMs each utilizing different VFs on the same physical storage adapter, IO sent by a VF directly accessed by a virtual machine is associated with a virtual port assigned to that VF as opposed to the single physical port of the VF's physical adapter. To that end, during the resource provisioning phase, the above-mentioned virtual port is allocated and persistently associated with the VF 316.

A virtual port is assigned for each VF provisioned to a VM. In the realm of storage virtualization, there exists a notion of a virtual port that exists in software. A virtual port provides a unique transport level address just as a physical port does. The virtualization intermediary 310 performs a series of logins to the fabric on behalf of the VM associated with the VF to which the virtual port is assigned, to authenticate the virtual port and to receive a transport address. As a result of the login operation, the virtual port is authenticated with the fabric, and has an established transport connection to a physical SCSI target. Thus, the VF associated with the virtual port serves as an initiator in a SCSI path triplet (virtual SCSI initiator, physical SCSI target, physical LUN).

During both resource provisioning and the runtime life of a virtual machine, physical SCSI storage utilized for virtual disks to be directly accessed by a given VF should be 'visible' from that VF's virtual port. The provisioning utility 351 shown in FIG. 4B communicates to the storage stack 328 the identity of the virtual port that is bound to the virtual function 316. The storage stack 328 within the virtualization intermediary 310 tracks SCSI active paths. The provisioning of physical storage for use by the VF 316 and access to this storage at runtime by the VF must be via a virtual port.

The existence and identity of the virtual port is communicated from the PF to the VF, and the VF ensures that IO sent on the interface of VF 316 for the physical storage (e.g., SAN) 308 utilizes the SCSI transport address of the virtual port and not the adapter's physical port SCSI transport address.

During 'steady state' operation, when an application running on the guest OS 307 makes an IO request, a storage stack (not shown) within the guest OS 307 identifies a virtual storage device to service the IO request and identifies that virtual storage device to the VF driver 321. The VF driver 321 obtains active path corresponding to the identified virtual device. Identifying the active path may require obtain active path information from a region of memory shared by the VF driver with the virtualization intermediary. The guest VF driver dispatches an IO request that contain the currently active path corresponding to the identified virtual storage device to the VF 316, which operates as a virtual device that is controlled by the VF driver 321. The VF 316, in turn, uses the virtual port to exchange SCSI read/write communications via a SCSI transport level protocol (e.g. SAS, Fibre Channel or iSCSI) between the VF 316 and regions of physical storage identified in terms of (physical targets, physical logical units). Thus, from the perspective of the VF 316, it is the guest OS 307 that initiates the IO request, and from the perspective of physical storage 308, it is the VF 316 that initiates the IO request.

In the course of instantiating (i.e. creating) a new virtual machine 304, the provisioning utility 351, allocates one or more previously created virtual disks (i.e. virtual SCSI logical units) to such new virtual machine 304. Many, perhaps hundreds of virtual disks can be allocated to a given virtual machine 304. Each virtual disk that is allocated to the given virtual machine 304 is assigned a unique virtual address that includes a two-tuple comprising a virtual SCSI target, virtual SCSI LUN.

The instantiation of the virtual machine 304 also includes simulation of an actual "power on" event on the virtual hardware. In reaction to this event, the virtual machine's BIOS enters a boot sequence and starts up the guest operating system 307 of the given virtual machine 304. As indicated by arrow 380, the guest OS 307 probes its virtualized PCI bus and matches virtualized PCI devices with guest drivers registered as capable of managing these virtualized PCI devices. The guest VF driver 321 claims the hybrid storage adapter (HSA) 320.

The virtual SCSI initiator is associated with one or more virtual SCSI targets. Virtual SCSI logical units (i.e. virtual disks $V_{D1} \ldots V_{Dk}$) allocated to a given virtual machine 304 are identified using one or more different virtual SCSI LUNs associated with the one or more virtual SCSI targets. The virtual SCSI initiator alluded to here at this juncture of the IO dispatch is the initiator address of the HSA 320 on the virtual SCSI bus associated with the guest operating system 378. This virtual SCSI initiator address is used by the guest's SCSI module in the guest's storage stack (not shown). The layers above the VF driver 321 have no cognizance of a VF. They just regard the HSA 320 as one SCSI initiator to which there are attached disk devices $V_{D1}, \ldots V_{Dk}$. When the guest storage stack (not shown) sends IOs down to the guest VF driver 321, depending on the nature of the IO request, it is routed either down the emulated plane to the storage stack 328 of the hypervisor 310 or the VF 316

As part of the initialization of its claimed device, that is the HSA 320, the guest driver 321 retrieves attributes from the HSA 320. The guest driver finds out about the first and second HSA PCI memory spaces 311, 313 via the HSA's emulated PCI configuration space 309. The guest VF driver 321 issues control messages to the HSA 320 to retrieve HSA specific attributes such as its virtual SCSI initiator address and all virtual SCSI targets accessible via that SCSI initiator. These messages are sent over the second HSA PCI memory space 313 as indicated by arrow 382, where they are trapped and emulated by the HSA 320 and forwarded to the virtualization intermediary 310 as indicated by arrow 384. The storage stack 328 of the virtualization intermediary 310 informs the guest driver 321 of the virtual SCSI targets associated with the VF 316 allocated to VM 304 as indicated by arrow 386.

As indicated by arrow 388, the guest driver 321 passes information concerning the existence of the discovered virtual SCSI target to the higher level software within the guest operating system 307. As indicated by arrow 380, storage stack 329 of the guest operating system 307 probes the SCSI target for virtual SCSI LUNs of that SCSI target by sending SCSI commands to all possible SCSI logical units on all such virtual SCSI targets. The virtual SCSI LUNs correspond to the one or more virtual logical units (i.e. virtual disks) allocated to the virtual machine 304. The guest operating system of the virtual machine 304, therefore, has knowledge of the (virtual SCSI target, virtual SCSI LUN) address information that identify virtual SCSI logical units (i.e. virtual disks) allocated to the given new virtual machine 304.

Also, the ptCS module 350 is loaded to the virtualization intermediary 310. It registers a callback with the multipathing software 328-3 (See FIG. 3) for notifications on current active path state change events. The callback can be either registered per SCSI device, or for a general path state change event. More particularly, the ptCS module 350 registers callbacks on behalf of the virtual machines to which VFs have been provisioned. The ptCS registers callbacks for each SCSI device for which a virtual disk has been provisioned to any one of the above-mentioned VMs, and keeps track of the VM to which the virtual device has been provisioned to so that it can notify the right VM.

During normal runtime operation, it is the guest operating system 307 that determines which logical unit (i.e. virtual disk) is implicated by a given physical storage access request.

Multipathing During Runtime

In the following sections, it will be understood that the guest VF driver 321 acts as a "para-virtual" device that knows which commands to direct to the first HSA PCI memory space 311 and knows which commands to direct to the second HSA PCI memory space 313. For example, in the course of instantiation of the given virtual machine 304, which is described above with reference to FIGS. 4A-4C, the guest VF driver 321 directs SCSI control plane commands (i.e., non-Read/Write SCSI commands and all SCSI task management operations) to the second HSA PCI memory space 313. During runtime operation, the guest VF driver 321 directs only certain SCSI Read/Write commands to the first HSA memory space 311 and directs all other SCSI commands to the second HSA memory space 313.

During runtime, the HSA 320 in conjunction with the guest driver 321 directs certain SCSI commands, i.e. certain Read/Write SCSI commands, via the first HSA PCI memory space to the VF 316 for direct access to the host machine's storage adapter. In particular SCSI Read Commands and SCSI Write Commands with Command Data Blocks (CDBs), forms of IO access requests, having byte sizes of 6, 10, 12 or 16 are directed to the VF 316 via the first HSA PCI memory space 311 for direct access to the storage adapter. Other SCSI commands such as for configuration or discovery, etc., are directed via the second HSA PCI memory space 313 to the virtualization intermediary 310, which performs emulated processing.

At this juncture in an IO dispatch, the VF 316 is the initiator. That is, the VF 316 is the initiator from the perspective of the I/O request when it reaches out in the fabric (not shown), or from the perspective of a target port (not shown) in the fabric that receives the request sent via the VF. Up until this juncture, the VF 316 appears as merely a memory mapped region that is part of the HSA 320 that the guest VF driver 321 "knows" to send read/write IO requests to.

IO Dispatch

Figure 5:
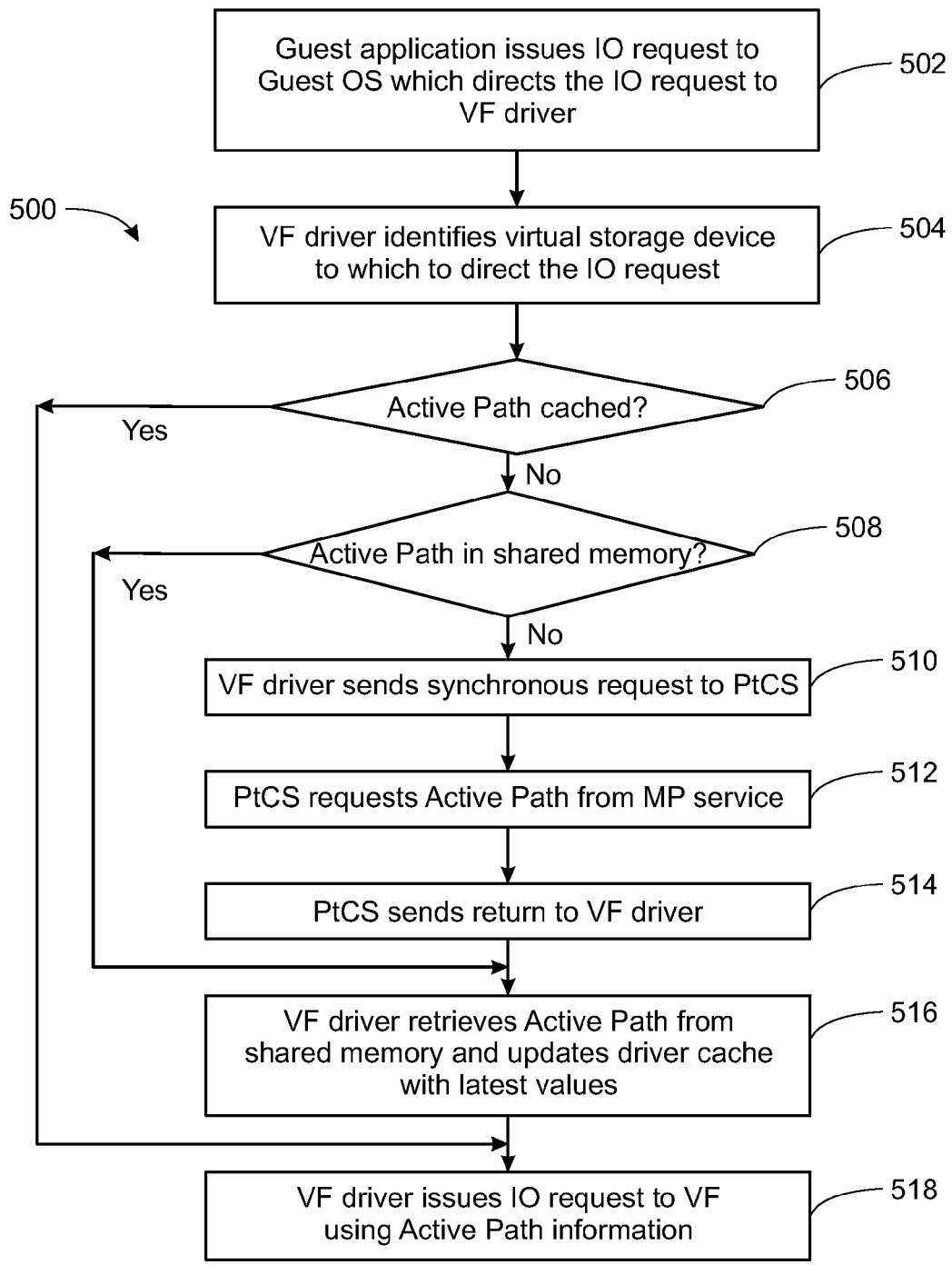
FIG. 5 is an illustrative flow diagram of a runtime process in which a virtual machine guest operating system and a multipathing process of the virtualization intermediary of the system of FIG. 3 collaborate in an IO dispatch.

FIG. 5 is an illustrative flow diagram of a runtime process 500 in which a virtual machine guest operating system 307 and a multipathing service 328-3 of the virtualization intermediary 310 collaborate in an IO dispatch. One or more physical processors of the host machine 302 are configured according to machine readable program code stored in a storage device machine to perform the process 500. The flow diagram of FIG. 5 includes a plurality of modules, each representing an aspect of the process that involves configuring one or more processors of the host machine 302 to perform a specified function of such module.

In module 502, an application program running on the virtual machine 304 issues an IO request to the guest operating system 307, which in turn, directs the IO request to the guest driver 321. The IO request identifies a virtual storage device (e.g. $V_{D1}$, $V_{D2}$ ... or $V_{Dk}$) to be accessed to Read or write data for example. In module 504, the VF guest driver 321 identifies the virtual storage device of VM 304 that the IO request is directed to. Specifically, the guest operating system determines the virtual target and virtual LUN (i.e. the virtual path) that identifies the virtual storage device, e.g. $V_{D1}$, $V_{D2}$, ... or $V_{Dk}$. Modules 506-518 represent a configuration of or more physical processors of the host machine 302 to make calls to the multipathing layer 328-3 to request identification of the current active path to a given specific physical device. More particularly, modules 506-518 represent configuration of one or more physical processors of the host machine 302 to communicate active path information from the virtualization intermediary 310 to the guest driver 321 via shared memory 360 in response to a request from the guest driver 321.

In decision module 506, the guest VF driver 321 determines whether its internal cache 321-1 contains current active physical path information for the identified virtual storage device. If in decision module 506 the guest driver 321 determines that its internal cache 321-1 does contain the current active path information then control flows to module 518, and the guest driver 321 issues the IO request to the VF 314 using the cached physical address attributes. If on the other hand, the guest VF driver 321 determines in decision module 506 that its internal cache 321-1 does not contain the current active path information then decision module 508 determines whether the shared memory 360 contains the sought after active path information. If in decision module 508 the guest VF driver 321 determines that the shared memory 360 does contain the needed information then control flows to module 516 in which the guest driver 321 retrieves the current active path information from the shared memory 360. However, if in decision module 508 the guest VF driver 321 determines that the shared memory 360 does not contain the needed information then control flows to module 510.

In module 510, the guest VF driver 321 sends a synchronous function call to the ptCS service 350 in the virtualization intermediary 310 to request the physical address attributes (i.e. physical target and physical LUN) associated with the identified virtual device. More particularly, the guest driver 321 sends to the second HSA PCI memory mapped interface 313 of the HSA 320 a message that identifies the virtual storage device for which a current active path is needed.

In module 512, the virtualization intermediary 310 traps the virtual SCSI address. Control flow is transferred to the passthrough control service (ptCS) 350 within the virtualization intermediary 310. The callout service 352 obtains from the shared memory 360 the requested current active path information from the multipathing service 328-3 and stores it in the shared memory 360.

In module 514, the ptCS 350 sends to the guest driver 321 a return of the synchronous function call to inform it that the shared memory 360 has been updated to include the current active path for the physical storage region corresponding to the identified virtual storage device. In module 516, the guest driver retrieves the physical address attributes (i.e. the current active path) from the shared memory 360. In module 518, the guest driver issues the IO request to the VF 314 using the physical address attributes retrieved from the shared memory 360. It will be appreciated that since the update of the shared memory 360 is performed in the context of the VCPU thread, there is no additional need for synchronization across the guest driver 321 and the ptCS service 350 of the virtualization intermediary 310.

Asynchronous Updates

Figure 6:
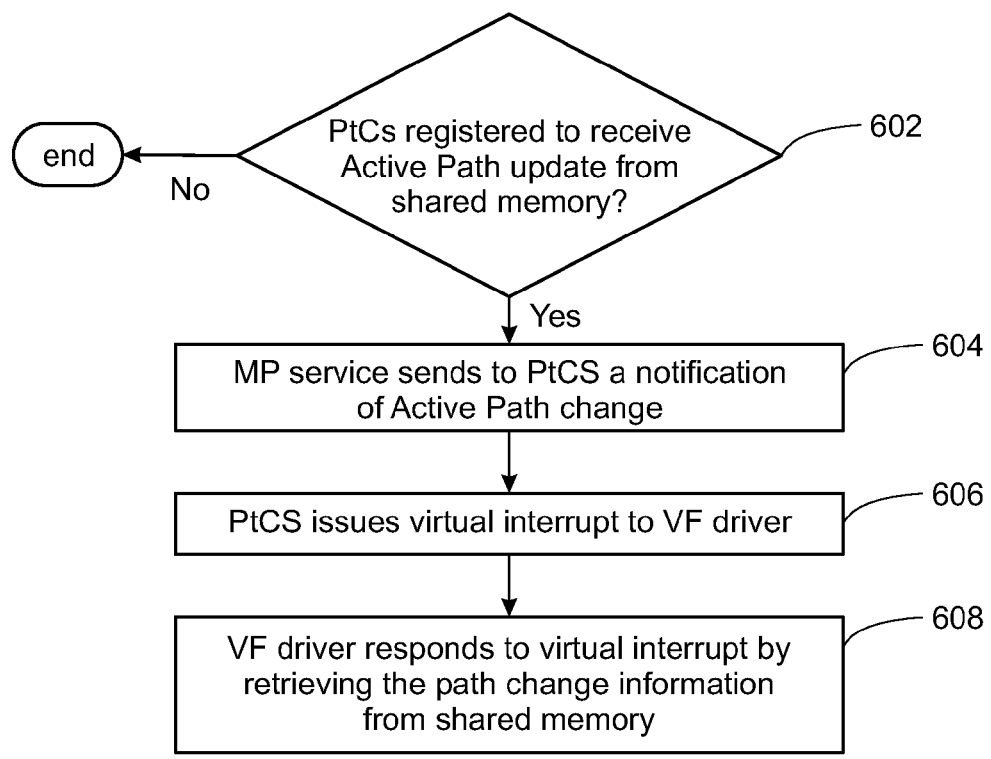
FIG. 6 is an illustrative flow diagram of a runtime process in which the virtualization intermediary provides asynchronous notifications of active path state change events so as to update the values cached by the guest VF driver of the system of FIG. 3.

FIG. 6 is an illustrative flow diagram of a runtime process 600 in which the virtualization intermediary 310 provides asynchronous notifications of active path state change events so as to update the values cached by the guest VF driver 321. The process 600 keeps the virtual machine 304 apprised of the most recent active path for each virtual storage device (e.g. virtual disk) provisioned to the virtual machine 304. One or more physical processors of the host machine 302 are configured according to machine readable program code stored in a storage device machine to perform the process 600. The flow diagram of FIG. 6 includes a plurality of modules, each representing an aspect of the process that involves configuring one or more processors of the host machine 302 to perform a specified function of such module.

Persons skilled in the art will understand that some external event may cause the multipathing service 328-3 to change the active path to a given SCSI physical device in response to some external event in the SAN, for example. Such events may result from changes in the active end points in the transport and typically are accompanied by asynchronous transport change notifications provided from the SAN to the physical storage adapter 306, which forwards notification of the event up the virtualization intermediary storage stack 328 to the multipathing service 328-3. In response to notification of such event, the multipathing service 328-3 initiates a path state change process that changes the active path associated with the given SCSI physical device. In other words, a state of a path associated with the given SCSI physical device that previously was the 'active' path is changed from 'active' to 'down' (or 'inactive'), and the state of another path associated with the given SCSI physical device that previously was a 'down' (or 'inactive') path is changed from 'down' to 'active'.

Referring to FIG. 6, in module 602, the multipathing service 328-3 determines whether the ptCS 350 registered to receive notification of a given active path state change. Note that multiple virtual machines (not shown) may run on the host machine 302 in direct-access mode, and each may include an HSA 320 that registers for callbacks from the ptCS 350. Modules 604-608 represent configuration of the host machine 302 to report active path change events to the guest VF driver 321. More specifically, modules 604-608 represent configuration of the host machine 302 to cause the virtualization intermediary 310 to provide active path change information to the memory space 360 that is shared with and accessed by the guest driver 321. In module 604, the ptCS 350 receives from the multipath service 328-3 a callback notification of an active path change. In module 606 the ptCS callback service 354 raises a virtual interrupt on the HSA 320. The interrupt handler for the virtual interrupt is part of the Guest driver 321 of the virtual machine 304 that has been provisioned the virtual storage device that corresponds to the given SCSI physical device for which there has been an active path change. In response to the virtual interrupt, in module 608, the Guest driver sends a synchronous function call to the callout service 352 and retrieves the active path information from the shared memory 360 and inputs it to cache 321-1.

Example IO Dispatch with Guest VF Driver Cache Hit

FIG. 7 is an illustrative drawing showing a first example scenario in which a first table 702 is a data structure stored in association with a guest VF driver cache 321-1 of virtual machine referred to as VM1. The first table 702 associates virtual storage devices with active physical paths. Note that multiple VFs have been configured for VM1, each serving as a different virtual initiator. The first table 702 includes a row entry that associates virtual initiator ($VI_n$) with the virtual device identified by the 2-tuple (virtual target ($VT_n$), virtual LUN ($VL_n$)) with the active path identified by (physical initiator ($PI_n$), physical target ($PT_n$), physical LUN ($PL_n$)).

Referring to the process 500 of FIG. 5, and assuming that an IO dispatch is to be issued to the virtual storage device on the virtual path ($VI_n$, $VT_n$, $VL_n$), then in decision module 506, the guest driver 321 locates corresponding the current active path ($PI_n$, $PT_n$, $PL_n$) in the first table 702 in its cache 321-1. The control flows to module 518, and the guest driver 321 issues the IO request to the VF 314 using the cached located active path.

Example IO Dispatch with Match in the Shared Memory

FIG. 8 is an illustrative drawing showing a second example scenario in which a second table 802 is stored as a data structure in the guest VF driver cache 321-1. The second table 802 associates virtual storage devices with active physical paths. The second table 802 includes a row entry that lacks an association between the virtual path ($VI_n$, $VT_n$, $VL_n$) and a current active path. FIG. 9 is an illustrative drawing showing additional details of the second example scenario in which a third table 902 is stored in the shared memory 360. The third table 902 stores associations for a given virtual machine ("VM1" in this example) between virtual paths and current active paths.

Referring again to the process 500 of FIG. 5, and assuming that an IO dispatch is to be issued to a virtual storage device identified by the virtual path ($VI_n$, $VT_n$, $VL_n$), in decision module 506, there is a determination that the there is no corresponding current active path identified within the second table 802 in the guest driver's cache 321-1. The control flows to decision module 508, which determines whether the third table 902 in the shared memory 360 contains the sought after active path information. In this second scenario, decision module 508 determines that the shared memory 360 contains the corresponding current active path ($PI_n$, $PT_n$, $PL_n$), which is provided to the guest driver 321 in module 516. Upon issuing the IO dispatch using the identified current active path, the Guest driver 321 updates its cache 321-1 to include the newly determined active path corresponding to the virtual storage device.

Recall that during initialization, the multipathing service 328-3 populates the shared memory 360 (e.g. the third table 902) with current active paths to match each virtual path provisioned to a given virtual machine. Continuing with the second example scenario, as explained with reference to FIG. 6, the ptCS 350 and the multipathing service 328-3 collaborate to update the third table 902 in the event of changes in active paths.

Example IO Dispatch with No Match in the Shared Memory

FIG. 10 is an illustrative drawing showing a third example scenario in which a fourth table 1002 is stored in the Guest driver cache 321-1. Like the second table 802 of FIG. 8, the fourth table 1002 of FIG. 10 includes a row entry that lacks an association between the virtual path ($VI_n$, $VT_n$, $VL_n$) and a current active path. FIG. 11 is an illustrative drawing showing additional details of the third example scenario in which a fifth table 1102 is stored in the shared memory 360. The fifth table 1102 stores associations for a given virtual machine ("VM1" in this example) between virtual paths and current active paths. In this third example scenario, however, the fifth table 1102 also lacks an active path association for the virtual path ($VI_n$, $VT_n$, $VL_n$).

Referring yet again to the process 500 of FIG. 5, and assuming that an IO dispatch is to be issued to a virtual storage device identified by the virtual path ($VI_n$, $VT_n$, $VL_n$), in decision module 506, there is a determination that the there is no corresponding current active path identified within the fourth table 1002 in the guest driver's cache 321-1. The control flows to decision module 508, which determines that the shared memory 360 does not contain a current active path associated with the virtual path ($VI_n$, $VT_n$, $VL_n$). Accordingly, in module 510, the guest driver 321 sends a synchronous function call to the ptCS service 350 in the virtualization intermediary 310 to request the physical address attributes associated with virtual path ($VI_n$, $VT_n$, $VL_n$). The process 500 of FIG. 5 proceeds as described above from that point.

The foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

The invention claimed is:

1. A method of direct access by a virtual machine (VM) running on a host machine to physical storage via a virtual function (VF) running on an input/output (IO) adapter comprising:
    storing by a virtualization intermediary an indication of an active path associated with a virtual storage device to a memory region shared by a guest driver and the virtualization intermediary, wherein the guest driver runs in a first memory space region of a first context and the virtualization intermediary runs in a second memory space region of a second context, and wherein the first memory space region and the second memory space region are different memory space regions except for the shared memory region;
    obtaining by the guest driver the stored indication of the active path from the shared memory region without changing the first context of the guest driver running in the first memory space region to the second context of the virtualization intermediary running in the second memory space region;
    dispatching an IO request by the guest driver directly to the VF that includes the indication of the active path without intervention from the virtualization intermediary; and
    sending by the VF the IO request that includes the indicated active path.

2. The method of claim 1, wherein the active path information includes a physical SCSI target identifier and a physical LUN identifier.

3. The method of claim 1, wherein the IO request sent by the VF includes a SCSI path triplet including a virtual SCSI initiator, a physical SCSI target and a physical LUN in which the VF serves as the virtual SCSI initiator.

4. The method of claim 1, wherein sending the IO request by the VF includes sending using a transport level protocol in which the VF is identified by a virtual port.

5. The method of claim 4, wherein the transport level protocol includes at least one of SAS, fibre channel or iSCSI.

6. The method of claim 1 further including:
    determining by the guest driver whether an indication of the active path associated with the virtual storage device is provided in a cache storage associated with the guest driver;
    performing the act of obtaining by the guest driver the stored indication of the active path from the shared memory region when the cache storage does not contain an indication of the active path; and
    obtaining by the guest driver the stored indication of the active path from the cache storage when the cache storage does contain an indication of the active path.

7. The method of claim 1 further including:
    storing the obtained indication of the active path to a cache storage associated with the guest driver.

8. The method of claim 1 further including:
    requesting from a multipath service associated with the virtualization intermediary the indication of the active path currently associated with the virtual storage device,
    wherein storing by the virtualization intermediary includes storing the active path indicated by the multipath service.

9. The method of claim 8, wherein the multipath service identifies multiple paths associated with a physical storage region associated with the virtualization intermediary and keeps track of which of those multiple paths currently is the active path.

10. The method of claim 1 further including:
receiving by the guest driver from a guest operating system of the VM the IO request that identifies the virtual storage device; and
requesting by the guest driver from the virtualization intermediary the indication of the active path to a physical storage region within the physical storage that is associated with the virtual storage device,
wherein the act of storing by the virtualization intermediary is responsive to the IO request by the guest driver.

11. The method of claim 10 further including:
providing by an application running on the guest operating system of the VM the IO request; and
determining by the guest operating system the virtual storage device to service the IO request.

12. The method of claim 1, wherein the first memory space region is a guest operating system memory space region and the second memory space region is a vmkernel memory space region different from the guest operating system memory space region, and wherein the shared memory region is part of an overlapping of the first memory space region and the second memory space region.

13. A method of direct access by a virtual machine (VM) running on a host machine to physical storage via a virtual function (VF) running on an input/output (IO) adapter comprising:
identifying by a virtualization intermediary running on the host machine a change in an active path associated with a virtual storage device allocated to the VM;
storing by the virtualization intermediary an indication of the changed active path to a memory region shared by a guest driver of the VM and by the virtualization intermediary, wherein the guest driver runs in a first memory space region of a first context and the virtualization intermediary runs in a second memory space region of a second context, and wherein the first memory space region and the second memory space region are different memory space regions except for the shared memory region;
sending by the virtualization intermediary a notification to the guest driver of the change in active path associated with the virtual storage device; and
obtaining by the guest driver the stored indication of the active path from the shared memory region without changing the first context of the guest driver running in the first memory space region to the second context of the virtualization intermediary running in the second memory space region, wherein the guest driver uses the active to path to send an IO request directly to the VF that includes the indication of the active path without intervention from the virtualization intermediary.

14. The method of claim 13 further including:
storing the obtained indication of the active path to a cache storage associated with the guest driver.

15. The method of claim 14 further including:
receiving by the guest driver from a guest operating system of the VM the IO request that identifies a virtual storage device;
obtaining by the guest driver the stored indication of the active path from the cache storage;
dispatching the IO request by the guest driver to the VF that includes the indication of the active path obtained from the shared memory region without intervention from the virtual intermediary; and
sending by the VF the IO request that includes the indicated active path.

16. The method of claim 13 wherein changing by the virtualization intermediary includes changing by a multipath process running on the host machine within the virtualization intermediary.

17. The method of claim 13, wherein the first memory space region is a guest operating system memory space region and the second memory space region is a vmkernel memory space region different from the guest operating system memory space region, and wherein the shared memory region is part of an overlapping of the first memory space region and the second memory space region.

18. A non-transitory machine readable storage device encoded with computer readable instructions to cause a machine to perform a process to direct access by a virtual machine (VM) running on a host machine to physical storage via a virtual function (VF) running on an input/output (IO) adapter, the process comprising:
storing by a virtualization intermediary an indication of an active path associated with a virtual storage device to a memory region shared by a guest driver and the virtualization intermediary, wherein the guest driver runs in a first memory space region of a first context and the virtualization intermediary runs in a second memory space region of a second context, and wherein the first memory space region and the second memory space region are different memory space regions except for the shared memory region;
obtaining by the guest driver the stored indication of the active path from the shared memory region without changing the first context of the guest driver running in the first memory space region to the second context of the virtualization intermediary running in the second memory space region;
dispatching an IO request by the guest driver directly to the VF that includes the indication of the active path without intervention of the virtualization intermediary; and
sending by the VF the IO request that includes the indicated active path.

19. A non-transitory machine readable storage device encoded with computer readable instructions to cause a machine to perform a process to direct access by a virtual machine (VM) running on a host machine to physical storage via a virtual function (VF) running on an input/output (IO) adapter, the process comprising:
identifying by a virtualization intermediary running on the host machine a change in an active path associated with a virtual storage device allocated to the VM;
storing by the virtualization intermediary an indication of the changed active path to a memory region shared by a guest driver of the VM and by the virtualization intermediary, wherein the guest driver runs in a first memory space region of a first context and the virtualization intermediary runs in a second memory space region of a second context, and wherein the first memory space region and the second memory space region are different memory space regions except for the shared memory region;
sending by the virtualization intermediary a notification to the guest driver of the change in active path associated with the virtual storage device; and
obtaining by the guest driver the stored indication of the active path from the shared memory region without changing the first context of the guest driver running in the first memory space region to the second context of the virtualization intermediary running in the second memory space region, wherein the guest driver uses the active to path to send an IO request directly to the VF that includes the indication of the active path without intervention from the virtualization intermediary.

20. An apparatus to provide direct access by a virtual machine (VM) running on a host machine to physical storage via a virtual function (VF) running on an input/output (IO) adapter comprising;

means for communicating active path information from a virtualization intermediary running on the host machine to a guest driver running within a guest operating system of the VM in response to a request from the guest driver to the virtualization intermediary through a shared memory region, wherein the guest driver runs in a first memory space region of a first context and the virtualization intermediary runs in a second memory space region of a second context, and wherein the first memory space region and the second memory space region are different memory space regions except for the shared memory region; and means for reporting active path information from the virtualization intermediary to the guest driver in response to a change in active path information within the virtualization intermediary through the shared memory region without changing the first context of the guest driver running in the first memory space region to the second context of the virtualization intermediary running in the second memory space region, wherein the guest driver uses the active path to send an IO request directly to the VF without intervention from the virtualization intermediary.

\* \* \* \* \*